United States Patent

[11] 3,609,682

[72] Inventor Michael E. Mitchell
Syracuse, N.Y.
[21] Appl. No. 842,289
[22] Filed July 16, 1969
[45] Patented Sept. 28, 1971
[73] Assignee General Electric Company

[54] AUGMENTED DIGITAL-ERROR-CORRECTING DECODER
12 Claims, 2 Drawing Figs.

[52] U.S. Cl. ........................................................ 340/146.1
[51] Int. Cl. ........................................................ G08c 25/00, H04l 1/10
[50] Field of Search ............................................ 340/146.1; 235/153; 325/41

[56] References Cited
UNITED STATES PATENTS

| | | | |
|---|---|---|---|
| 3,164,804 | 1/1965 | Burton et al. ................ | 340/146.1 |
| 3,222,644 | 12/1965 | Burton et al. ................ | 340/146.1 |
| 3,227,999 | 1/1966 | Hagelbarger ................ | 340/146.1 |
| 3,469,236 | 9/1969 | Gallager ...................... | 340/146.1 |

*Primary Examiner*—Malcolm A. Morrison
*Assistant Examiner*—Charles E. Atkinson
*Attorneys*—Carl W. Baker, Norman C. Fulmer, Frank L. Neuhauser, Oscar B. Waddell and Joseph B. Forman

ABSTRACT: An error correcting decoder circuit for decoding redundantly coded received digital signals. Estimator bits are generated from selected bits of a received code word, and estimator reliability signals are generated in accordance with word-bit error probability signals derived from the received analog signal amplitudes associated with the same selected bits of the code word as are used for generating the estimator bits. The estimator reliability signals are used as a basis for weighting the bipolar estimator bit voltages, by increasing or decreasing their absolute values, whereby the more reliable estimator bits are given greater weights at the input of a threshold decision circuit. The threshold decision circuit generates an output bit in accordance with the arithmetic sum of the weighted estimator bit voltages, except that it substitutes the appropriate received bit in place of the unreliable threshold decision that arises in the event that the sum is small in magnitude. Control circuitry is provided for causing repetitive shifting of the word bits in a first shift register and of word-bit error probability signals in a second shift register, for performing step-by-step decoding of a received word with the aid of the received signal reliability indications. The invention thus provides a means of augmenting the digital error correction capability of decoders through the use of auxiliary outputs from the receiver which indicate the received signal quality.

FIG. 2

INVENTOR:
MICHAEL E. MITCHELL,

BY Norman C. Fulmer
HIS ATTORNEY.

AUGMENTED DIGITAL-ERROR-CORRECTING DECODER

BACKGROUND OF THE INVENTION

The invention is in the field of electronic systems for the transmission of information in the form of coded digital signals. The invention is particularly directed to error-correcting decoder circuits for decoding redundantly coded signals representing information such as computer data, telemetry information (for rockets and space stations, for example), stock market quotations, airline reservations, and other business and scientific data.

A frequently used technique for transmitting information, is to convert the information into a binary form consisting of "1" bits and "0" bits. These bits are frequently grouped into binary data words representing the elemental units of data to be transmitted. The type of coded information transmission system to which the invention best applies, employs an encoder at the transmitter which generates a number of extra (redundant) bits to be associated with each binary data word to form a code word for transmission, and employs a decoder at the receiver which decodes the received coded signals to recover the data words. Numerous error-correcting codes have been devised, having the general characteristic of adding redundant bits to the data words according to systematic rules so as to form code words such that, if during transmission a limited number of the bits in a code word becomes altered or obliterated due to static, noise, fading or other causes, the received code word will nonetheless differ from any other code word in a sufficient number of bits so that the decoder will be able to properly decode it into the correct binary data words.

One type of error-correcting system, described in U.S. Pat. No. 3,237,160 to Michael E. Mitchell and assigned to the same assignee as the present invention, employs a decoder at the receiver which functions to compare each incoming word with a code word vocabulary. By the process of correlation, the correct (or most likely correct) binary data word is selected and fed out of the decoder.

Another general type of error-correcting system, to which the present invention belongs, is described in U.S. Pat. Nos. 3,164,804 and 3,222,644 to Burton and Mitchell and assigned to the same assignee as the present invention. In this type of system, each received binary word is sequentially fed into a register, and "estimator" logic circuits generate estimator bits in accordance with the contents of certain stages of the register. A majority logic circuit provides an output bit in accordance with the majority of the estimators. The register is then shifted one step and the foregoing sequence repeated, and so on, whereby the decoded data-word bits are obtained and fed out from the decoder.

Although a very high degree of accuracy of data transmission is achieved by the presently known systems, greater accuracy and reliability are desired and have been the subject of considerable research and development efforts.

SUMMARY OF THE INVENTION

Objects of the invention are to provide an improved error-correcting decoder, and to increase the decoding accuracy and reliability of such a decoder.

The invention comprises, briefly and in a preferred embodiment, an error-correction decoder circuit for decoding received digital-coded signals of the type comprising data bits accompanied by redundant bits. The decoder circuit generates a plurality of estimator bits from selected bits of a received code word, in a well-known manner, and the estimator bits are utilized by a decision circuit for determination of the most likely transmitted data bit. The foregoing procedure is repeated for decoding successive data bits from each received code word. In accordance with a feature of the invention, circuitry is provided for generating a plurality of reliability signals in accordance with word-bit error probability signals derived from the received signal amplitudes corresponding to the same selected bits of the code word as are used for generating the estimator bits, and weighting means are connected to apply weighting factors to the estimator bits in accordance with the reliability signals, whereby the more reliable estimator bits are given greater weights by the decision circuit and whereby the most unreliable estimator bits are not utilized by the decision circuit. In accordance with another feature of the invention, circuitry is provided for causing repetitive shifting of the word bits in a first shift register, and of the word-bit error probability signals in a second shift register, for performing step-by-step decoding of a word in a manner achieving greater accuracy of the decoded data bits. In accordance with a further feature of the invention, circuitry is provided for producing and feeding into said second shift register a decoded-bit error probability signal indicative of the reliability of the decoded bit as a function of an auxiliary output of the decision circuit.

DESCRIPTION OF THE PREFERRED EMBODIMENT

Figures 1, 2:
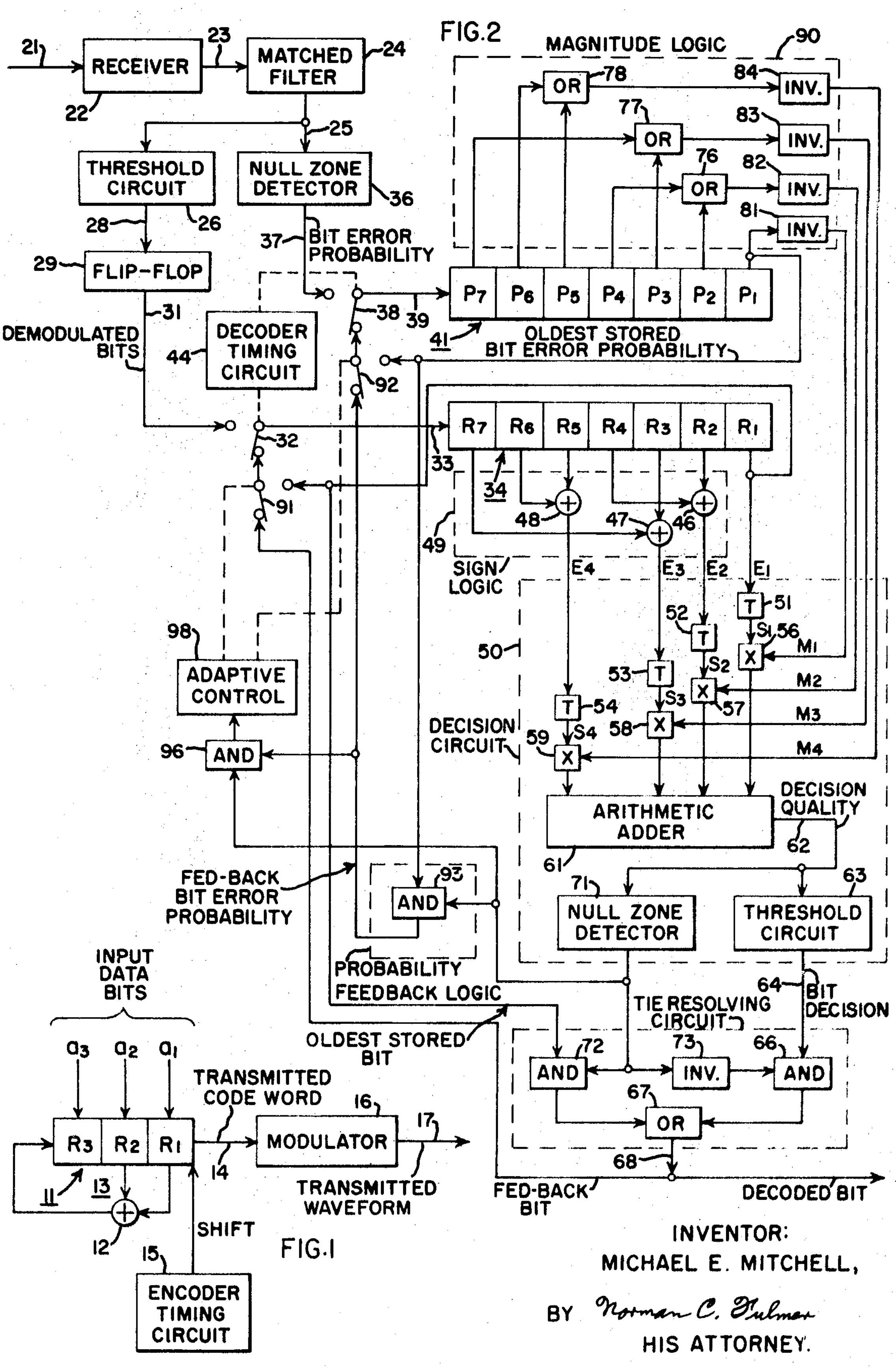
FIG. 1 is an electrical block diagram of an encoder for use with a preferred embodiment of the invention.
FIG. 2 is an electrical block diagram of a receiver including a decoder in accordance with a preferred embodiment of the invention.

In the encoder circuit of FIG. 1, a plurality of binary data bits $a_1$ through $a_3$ are respectively applied to stages $R_1$ through $R_3$ of a shift register 11. The contents of stages $R_1$ and $R_2$ are fed to a modulo 2 adder 12, the output of which is fed into stage $R_3$ of the shift register 11. The input data bits $a_1$ through $a_3$ each constitutes a binary "1" or "0," in standard binary parlance. The mod 2 adder 12 provides the mod 2 sum of the binary addition inputs. As is well known, mod 2 addition is the same as binary addition except that carries are ignored. The symbol for mod 2 addition is $\oplus$ and the possible summations of the various combinations of binary inputs are as follows:

$$0\oplus0=0$$
$$1\oplus1=0$$
$$0\oplus1=1$$
$$1\oplus0=1$$

The arrangement of the shift register 11 and mod 2 adder 12 comprises an encoder 13 that can produce, at the output of the shift register 11, any word of the (7,3) code, consisting of seven bits per coded word, of which the first three bits are data bits and the remaining four bits are redundant bits added for coding purposes. The shift register 11 is sequentially shifted toward the right under control of a timing circuit 15, a step at a time, to produce the aforesaid coded output at 14. The aforesaid U.S. Pat. No. 3,222,644 shows and describes in more detail an arrangement for producing any word of the (15,7) code. The code words comprising various other codes can be similarly produced. The coded output at 14 is fed to a modulator 16 which modulates a carrier with the code word bits. The modulator output at 17 is transmitted by suitable means, such as radio waves or telephone wires, to a receiver which includes a decoder.

In the circuit of FIG. 2, the signal received from the circuit of FIG. 1 is applied to the input 21 of a receiver 22, the output 23 of which is the received waveform, which is fed to a matched filter 24. The output 25 of the matched filter 24 is a voltage indicative the 1 and 0 bits of the received code words. Under ideal conditions, the voltages indicative of the 1 and 0 bits are typically of equal magnitude and opposite polarity. Under actual conditions, however, the voltage magnitudes at the output 25 of the matched filter are subject to considerable variation due to noise, fading, interference, and other causes. Therefore, in accordance with customary practice, this voltage is applied to a threshold circuit 26, the output 28 of which is a voltage quantized signal indicative of whether the voltage at 25 represents a 0 bit or a 1 bit, and this output 28 is sequentially sampled and fed to a flip-flop circuit 29 the output of which consists of a timed sequence of 0 bits and 1 bits as determined by the functioning of the threshold circuit 26 on the matched filter output 25.

The output 31 of the flip-flop circuit 29 is connected to a selectable terminal of a double-throw electronic switch 32, the common terminal of which is connected to the input 33 of a seven-stage shift register 34 comprising stages $R_1$ through $R_7$.

In accordance with a feature of the invention, the matched filter output 25 is applied to the input of a null zone detector 36 having a null zone range such that the output signal 37 thereof is indicative of whether the demodulated bits at 31 derived from the matched filter output 25 are unreliable, as evidenced by a weak signal at 25, lying within the null zone, or whether these bits are reliable, as evidenced by a strong signal at 25, lying outside the null zone range. In the embodiment shown, the output 37 of the null zone detector 36 is a 0 bit whenever the matched filter output 25 is of sufficient amplitude to lie outside the null zone range, and this output 37 is a 1 bit whenever the matched filter output 25 is sufficiently weak to lie within the null zone range. For convenience, the matched filter output 25 is called a quality signal, and the output 37 of the null zone detector 36 is called a bit error probability, a 1-bit at this point indicating a high probability of a bit error, and a 0-bit indicating a low probability of a bit error.

The bit error probability output 37 of the null zone detector 36 is connected to a selectable input of a double-throw electronic switch 38, the common terminal of which is connected to the input 39 of a seven-stage shift register 41 having stages $P_1$ through $P_7$. Prior to the decoding of each coded word, the switches 32 and 38 are actuated by a decoder timing circuit 44 so that switch 32 connects the shift register 34 input 33 to the output 31 of the flip-flop 29, whereby the seven bits of a received code word are fed into the shift register 33. Simultaneously, the switch 38 connects the input 39 of shift register 41 to the output 37 of the null zone detector 36, whereby the seven bits of error probability are fed into the shift register 41. After thus loading the shift registers 34 and 41, the decoder timing circuit 44 changes the switches 32 and 38 to the positions shown in the drawing. During the decoding of a coded word, the shift register 34 and associated circuitry function to decode the word into its data bits, and the shift register 41 and associated circuitry function to apply weighing factors to the bit estimators feeding the decoding decision circuit 50 to increase the decoding accuracy thereof.

Within the sign logic circuit 49, a first modulo 2 adder 46 has inputs connected to receive the contents of stages $R_2$ and $R_4$ of the shift register 34; a second modulo 2 adder 47 has inputs connected to receive the contents of stages $R_3$ and $R_7$ of the shift register 34; and a third modulo 2 adder 48 has inputs connected to receive the contents of stages $R_5$ and $R_6$ of the shift register 34. The contents of stage $R_1$ of the shift register 34, and the outputs of the modulo 2 adders 46–48, constitute four estimator bits $E_1$ through $E_4$. In accordance with the coding system employed, the estimator bits $E_1$ through $E_4$ will all represent the correct data bit being decoded for each bit-decoding cycle, in the absence of bit errors. If, due to fading, interference, or other causes, one of these estimator bits has become erroneous, the circuitry now to be described will provide the correct data bit output on the basis of the three out of four correct estimator bits. Also, as will be described, if half of the four estimator bits are 1's and the other half are 0's, this tie, which would result in a meaningless or indeterminate output from the decoding decision circuit 50, is resolved by circuitry which functions to feed out the contents of stage $R_1$ of the shift register 34 to the decoder output.

The estimator bits $E_1$ through $E_4$ are respectively fed to translators 51, 52, 53, and 54 which translate the 1 and 0 estimator bits into pulses of respectively opposite polarity with respect to 0. For example, the 1 estimator bits are translated into positive polarity voltage pulses and the 0 estimator bits are translated into negative polarity voltage pulses. These translated positive and negative pulses are fed to multiplier circuits 56, 57, 58, and 59 where they are modified in accordance with reliability modifier signals $M_1$, $M_2$, $M_3$, and $M_4$ as will be described subsequently. The outputs of the multipliers 56 through 59 are fed to an arithmetic adder 61 the output of which is a positive polarity pulse if the arithmetic sum of its input pulses is positive, and a negative polarity pulse if this sum is negative. The magnitude of this output pulse represents the absolute value of this sum. The translation process facilitates weighting the estimator bits with the reliability modifier signals and also increases the accuracy of the addition and further processing, as compared to arrangements which add and process the normal unipolar 0 and 1 bit signals directly. The translator and multiplier outputs may consist of bipolar signal levels instead of bipolar pulses. The arithmetic adder 61 may have either a pulse or level output, and it may be constructed in either digital or analog form.

The output 62 of the arithmetic adder 61 is fed to a threshold circuit 63 which translates the positive or negative sum back to a 1 or a 0, respectively, at the output 64 thereof. The output 64 of the threshold circuit 63 is fed to an AND gate 66, the output of which is fed to an OR gate 67, the output 68 of which is the output of the decoder circuit. The output 62 of the adder 61 is also applied to a null zone detector 71, the output of which is applied to an input of an AND gate 72 and also, through an inverter 73, to the remaining input to the AND gate 66. The signal bit $E_1$ of stage $R_1$ of the shift register 34 is applied to the remaining input of the AND gate 72, the output thereof being applied to the remaining input of the OR gate 68.

The output signal of the null zone detector 71 is normally a 0, which is inverted by the inverter 73 and applied as a 1 to an input of the AND gate 66, whereby in normal operation all 1 bits at 64 pass through the AND gate 66 and through the OR gate 67 to the decoder output 68, and whereby 0 bits at 64 result in 0 bits at the decoder output 68. The null zone detector 71 produces a 1 output whenever the output 62 of adder 61 is 0, or is in a zone so close to 0 as to be unreliable. Such a zone is, for example, the zone between plus V and minus V if the 1 and 0 outputs from translator circuits 51–54 are respectively equal to plus V and minus V. When the null zone detector output is thus a 1, the inverter 73 applies a 0 to the AND gate 66 whereby the signal at 64 cannot reach the decoder output 68. At the same time, the 1 output of the null zone detector 71 enables the AND gate 72 whereby the data bit content of register stage $R_1$ is fed, through AND gate 72 and OR gate 67, to the decoder output 68 in lieu of the unreliable output of the threshold circuit 63.

The shift register 41 and associated circuitry for producing the reliability multiplying factors $M_1$ through $M_4$, will now be described. A first OR gate 76 has inputs connected to stages $P_2$ and $P_4$ of the shift register 41; a second OR gate 77 has inputs thereof connected to stages $P_3$ and $P_7$ of shift register 41; and a third OR gate 78 has inputs connected to stages to $P_5$ and $P_6$ of shift register 41, the input connections of the OR gates 76 through 78 to the stages of the shift register 41 corresponding respectively to the input connections of the modulo 2 adders 46 through 48 to the stages of shift register 34. Inverters 81 through 84 are respectively interposed in output connections of the stage $P_1$ of shift register 41, and of the OR gates 76 through 78, the outputs of these inverters 81 through 84 constituting the multiplying factors $M_1$ through $M_4$, respecvely, which are applied to inputs of the arithmetic multipliers 6 through 59 as has been described.

As has been explained, a 1 contained in a stage of the shift register 41 indicates a relatively high probability of error in the reception of the corresponding word bit, because the associated voltage at the output 25 at the matched filter 24 was so low in amplitude as to fall within the null zone range of detector 36, whereupon the detector 36 generated a 1 bit to be fed into the shift register 41. On the other hand, a content of 0 bit in a stage of the shift register 41 indicates a low bit error probability, (i.e. a high reliability), since the associated voltage at output 25 of the matched filter 24 was sufficiently great so that it fell outside of the null zone range of the null zone detector 36. Thus, if either of the inputs to one of the OR gates 76 through 78 is a 1, the output of this OR gate will be 1, which, inverted by the respective one of the inverters 82 through 84, feeds a 0 into the corresponding one of the arithmetic multipliers 57 through 59, which results in an estimator output of zero to the arithmetic adder 61 for any such low reliability bit. Likewise, if the content of stage $P_1$ of the shift register 41 is a 1, this 1 becomes inverted by inverter 81 and a zero is fed to the arithmetic multiplier 56, resulting in an estimator output $E_1$ of zero to the arithmetic adder for this particular bit having an indicated high error probability. As a result of the foregoing, only those estimator bits $E_1$ through $E_4$ which have low error probability (i.e., high reliability) contribute to the arithmetic sum 62 produced by adder 61 which is used in generation of the bit decision output 64.

The reason for employing the null zone detector 36 for generating discrete signal levels indicative of the bit error probability, it is that it is more economical to construct a shift register 41 capable of storing and shifting some limited number of two or more discrete signal levels, than it is to design and build a shift register 41 capable of storing and shifting an infinite or very large number of analog signal levels as appear at the output 25 of the matched filter 24. Instead of the described arrangement of a null zone detector 36 and binary shift register 41 for generating, storing, and shifting two discrete levels of bit error probability signals, more sophisticated circuitry may be justified in some cases on the basis of the higher performance capabilities resulting from the use of more than two different discrete levels of bit error probability signals in the decoding process. The more sophisticated decoders of this type may be called multilevel signal quality augmented digital-error-correcting decoders, and are attractive for use with a number of signal quality levels L equal to a power of two, since in this case maximum utilization of economical binary storage and logic elements is achieved. For example, in a preferred embodiment of the invention for the case of $L=4$, the null zone detector shown in FIG. 2 is replaced by an analog signal quality-to-estimated bit probability circuit that includes a standard two-bit analog to digital converter, and the binary shift register is replaced by a quaternary shift register consisting of a pair of seven-bit binary shift registers identical to the one shown in FIG. 2. Moreover, in the magnitude logic of the four-level augmented decoder, each binary logical OR gate of FIG. 2 is replaced by a probability-combining module incorporating a standard two-bit binary adder, and each binary logical inverter (INV) is replaced by a magnitude scaling logic module incorporating a standard two-bit digital-to-analog converter. It is understood that the invention is applicable to the use of all such multilevel signal quality augmented digital-error-correcting decoders, regardless of the number of levels or the specific combination of analog and digital circuits used to implement the basic concepts illustrated by the particular examples discussed.

By way of summary of the foregoing, the arrangement provides a decoding configuration for producing estimator signals and generating a decoded output bit based on the arithmetic sum of the estimator signals; and, in accordance with the invention, estimator reliability signals are derived from the received signal quality indications of the code signal waveform, and are applied to multiplier circuits (the multipliers 56 through 59) for weighing the estimator signals according to their indicated error probability.

After each data bit has thus been decoded, the decoder timing circuit 44 causes each of the shift registers 34 and 41 to shift its contents toward the right, whereupon the foregoing procedure is repeated in order to produce the next data output bit.

A pair of mode switches 91 and 92 are provided, each being a double-throw type. The mode switch 91 has its common terminal connected to a selectable terminal of the switch 32, as shown, and has the selectable terminals thereof respectively connected to the decoder output 68 and to the contents of stage $R_1$ of the shift register 34. Mode switch 92 has the common terminal thereof connected to a selectable terminal of the switch 38, as shown, and has its selectable terminals respectively connected to the output of stage $P_1$ of the shift register 41 and to the output of an AND gate 93 having inputs respectively connected to the output of stage $P_1$ and to the output of the null zone detector 71. With the mode switches 91 and 92 in the positions shown, the decoded output data bits from the decoder output 68 are sequentially fed into the input 33 of the shift register 34, and 0 bits (indicative of low error probability) are fed into the input 39 of the shift register 41 whenever the decision quality signal 62 produced by the arithmetic adder 61 has sufficient magnitude to cause the output of the null zone detector 71 to be 0, as has been described. When, however, the decision quality signal produced by the arithmetic adder 61 is too low, the above-described functioning of the null zone detector feeds a 1 bit to the AND gate 93, so that the output of stage $P_1$ of the shift register 41 is fed through the AND gate 93 and into the input 39 of the shift register 41.

When the mode switches 91 and 92 are thrown to their other positions, either individually or at the same time, the contents of either or both of the shift register 34 and 41 are circulated in response to shifting. These three other combinations of the positions of switches 91 and 92 define alternate modes of decoder operation appropriate to certain special types of error patterns generally described as high-density error bursts of a relatively long duration. The mode switches 91 and/or 92 may be set in advance to select the appropriate decoding mode, or in more sophisticated systems, the appropriate mode is automatically selected by adaptive circuitry which monitors the channel status, as indicated by the demodulated bit error probability signal 37, the decision quality signal 62, and/or other signals within or outside of the decoder, and in response to the changes in the channel status, adapts the decoding mode so as to maximize the reliability of the decoded data bits at 68. For example, an AND gate 96 has an input connected to the output of the null zone detector 71, and has another input connected to the output of AND gate 93. The output of AND gate 96 is applied to an adaptive control circuit 98 which functions to change the positions of one or both of switches 91 and 92 in response to detection of a relatively high frequency of error probability signals indicative of poor decision quality being fed to the input of the shift register 41.

The invention, by applying weighting factors to the estimator bits $E_1$ through $E_4$, and by weighing the feedback of shift register 41 by means of the AND gate 93, as described above, achieves the objectives of providing improved decoding accuracy and reliability. Recirculation of the contents of shift registers 34 and 41 is provided by the mode switches 91 and 92, when alternative decoding modes are appropriate.

While a preferred embodiment of the invention has been shown and described, various other embodiments and modifications thereof will become apparent to persons skilled in the art, and will fall within the scope of the invention as defined in the following claims.

I claim:

1. An error-correcting decoder circuit for decoding a received signal voltage representing a coded word made up of data bits and redundant bits, comprising means for deriving said word bits from said signal voltage, means for generating a plurality of estimator bits from selected bits of said coded word, and decision means for generating a decoded data bit with the aid of said estimator bits, wherein the improvement comprises means for providing a plurality of reliability signals in accordance with the amplitudes of said voltage from which selected bits of the coded word are derived, and weighing means connected to apply weighing factors to said estimator bits in accordance with said reliability signals, respectively, whereby the more reliable estimator bits are given greater weights in said decision means.

2. A decoder circuit as claimed in claim 1, in which said weighting means comprises a plurality of arithmetic multipliers respectively interposed in the paths of said estimator bits and having multiplier inputs respectively connected to receive said reliability signals.

3. A decoder circuit as claimed in claim 2, in which the reliability signals derived from relatively low amplitudes of said voltage from which said selected bits of the code word are derived have values such that when applied to said arithmetic multipliers the respective estimator bits are given zero weight and hence are not utilized by said decision means.

4. A decoder circuit as claimed in claim 1, including first and second shift registers, means for loading said first shift register with the bits of said coded word, means for loading said second shift register with error probability signals derived from the amplitudes of said voltage from which said word bits are derived, a plurality of means each connected to selected stages of said first shift register for generating said plurality of estimator bits, and a plurality of means each connected to selected stages of said second shift register for providing said plurality of reliability signals.

5. A decoder circuit as claimed in claim 4, in which said selected stages of the second shift register correspond to said selected stages of the first shift register, and in which said reliability signals are applied to said weighing means so as to respectively cause weighing of the estimator bits that are derived from the same said selected shift register stages as those from which the reliability signals are derived.

6. A decoder circuit as claimed in claim 4, in which said means for loading said second shift register includes conversion means for converting the amplitude of said voltage from which the word bits are derived into a plurality of discrete voltage signals on one or more signal conductors for loading into said second shift register.

7. A decoder circuit as claimed in claim 6, in which said conversion means comprises a null zone detector adapted to produce alternative output voltage signals indicative of whether said amplitude of the voltage from which the word bits are derived is relatively large or relatively small.

8. A decoder circuit as claimed in claim 4, including means for sequentially shifting said shift registers for the sequential decoding of data bits from a coded word, feedback means connected around said second shift register for selectively causing either circulation or replacement of said error probability signals therein, quality-indicating means for indicating the error probability of the decoded bits, and quality control means connected to said feedback means of said second shift register, said control means being responsive to said quality-indicating means and adapted to generate and feed to the input of the shift register an error probability signal.

9. A decoder circuit as claimed in claim 8, including an arithmetic adder connected to produce an output signal derived from said estimator bits, and in which said quality-indicating means comprises a null zone detector connected to the output of said arithmetic adder, and in which said control means connected to said feedback means of the second shift register comprises an AND gate.

10. A decoder circuit as claimed in claim 8, including an adaptive control means connected to said quality control means and adapted to detect the frequent occurrence of error probability signals indicative of a poor decision quality, and switching means adapted to selectively connect a direct feedback path from the output stage to input stage of one or both of said shift registers upon the occurrence of said last-named detection by the adaptive control means.

11. A decoder circuit as claimed in claim 4, including switching means connected to selectively connect the output stage of said first shift register to the input stage thereof, thereby providing a feedback path.

12. A decoder circuit as claimed in claim 4, including switching means connected to selectively connect the output stage of said second shift register to the input stage thereof, thereby providing a feedback path.